United States Patent [19]
Ford et al.

[11] Patent Number: 6,025,914
[45] Date of Patent: Feb. 15, 2000

[54] CATHODE SEAL INCLUDING MIGRATION RESISTANT DIELECTRIC MATERIAL

[75] Inventors: Carol M. Ford, Columbia Heights; Daniel W. Youngner, Maple Grove; J. David Zook, Minneapolis, all of Minn.

[73] Assignee: Honeywell Inc., Minneapolis, Minn.

[21] Appl. No.: 08/992,267

[22] Filed: Dec. 17, 1997

[51] Int. Cl.[7] .................................................. G01C 19/66
[52] U.S. Cl. .............................................. 356/350; 372/94
[58] Field of Search ................................ 372/94; 356/350

[56] References Cited

U.S. PATENT DOCUMENTS

| | | | |
|---|---|---|---|
| 5,098,189 | 3/1992 | VonBieren | 356/350 |
| 5,165,972 | 11/1992 | Porter | 428/1 |
| 5,432,604 | 7/1995 | Canfield et al. | 356/350 |
| 5,856,995 | 1/1999 | Morris | 372/87 |

*Primary Examiner*—James W. Davie
*Attorney, Agent, or Firm*—Albert K. Kau

[57] ABSTRACT

An apparatus and method for prevention of migration of mobile ions in a gyroscope. A dielectric barrier material layer is placed between a gyroscope body and one or more gyroscope components. The dielectric barrier material layer reduces the electric field formed in the gyroscope block, and thus reduces ion migration therein. The material may prevent mobile ions from reaching the cathode seal.

14 Claims, 2 Drawing Sheets

CATHODE SEAL INCLUDING MIGRATION RESISTANT DIELECTRIC MATERIAL

BACKGROUND OF THE INVENTION

The present invention relates to the reduction of ion migration in ring laser gyroscope blocks. Specifically, it relates to reduction of lithium ion migration from the ring laser gyroscope block to gyroscope components or component seals by adding a dielectric barrier material layer which is resistant to ion migration between the gyroscope block and one or more gyroscope components.

Ring laser gyroscopes are formed of solid blocks of material that, over a wide temperature range, are resistant to expansion. Several proprietary materials, such as the material known by the trademark "Zerodur", exhibit excellent dimensional stability over wide temperature ranges. The stability is found to be related to the presence of a lithium oxide in the material. The mentioned Zerodur, for example, includes approximately 3.7% lithium oxide. Unfortunately, lithium is in the form of ions which can be highly mobile in the presence of an electric field. Prevention of lithium migration caused by this field is critical since such migration will cause formation of undesirable lithium-rich layers which weaken component seals and shorten gyroscope life.

The mechanism which leads to the electric field is as follows. Laser gas within conduits in the gyroscope block is excited by placing voltages between spaced-apart anodes and a cathode which are attached to, or embedded in, the gyroscope block. The anodes are at a different potential from the cathode and serve as the primary means for production of an electric field in conjunction with the cathode during gyroscope operation. Other metallic or conductive components attached to, or part of, the gyroscope block may also be at a different potential from the cathode. These components may become secondary means for producing an electric field in the gyroscope block during operation, thus also causing ion migration.

In the case of Zerodur, the electric field created in the gyroscope block during operation applies a force on the lithium ions, attracting them toward the cathode. Oxide ions, on the other hand, migrate toward the anode or other component having a different charge from the cathode. Thus, over the operating life of the gyroscope, a significant amount of lithium ions migrate through the gyroscope block toward the cathode. The lithium ions arriving at the cathode are neutralized by electrons there; hence lithium accumulates at the cathode seal surface. The integrity of the cathode-gyroscope block seal is endangered by this accumulation because the lithium-rich structure is not a mechanically strong one, and the higher the concentration of this material at the seal, the larger the chance of seal failure. The problem may be complicated by non-ideal lithium concentrations in the seal area which cause coefficient of thermal expansion (CTE) variations which may also stress the seal area.

Lithium migration and/or contamination has been recognized as a possible problem in the ring laser gyroscope field, and several solutions have been proposed. In U.S. Pat. No. 5,098,189 to vonBieren, a gas gap is used to interrupt the flow of current in a direct line between the cathode and the anode or other differently-charged components. This solution will only slightly reduce lithium migration since the electric field through the gyroscope block remains, and the lithium migration path is only lengthened slightly. At best, it results in a space charge at the gas gap surface which reduces the electric field in the block. In U.S. Pat. No. 5,432,604 to Canfield, et al., a dielectric material is used to block lithium migration to the laser passages in the gyroscope block because the laser beams tend to carry the lithium and deposit it on the gyroscope mirror surfaces. Neither patent recognizes that significant reduction in lithium migration can be achieved by substantially reducing the electric field appearing in the block of the gyroscope.

BRIEF DESCRIPTION OF THE INVENTION

The present invention provides a structure and method for reducing mobile ion migration in gyroscope blocks to cathode seals. In particular, the invention describes the use of a migration-resistant dielectric barrier material layer which is interposed between the gyroscope block and the cathode or other components. This layer causes a significant portion of the voltage between the cathode and the anode or other component to drop in the dielectric barrier material layer rather than in the gyroscope block. The use of the migration-resistant dielectric barrier material layer also prevents seal degradation otherwise caused when lithium oxide concentrations are altered in the cathode seal area, since the dielectric also works as a barrier to prevent ions from reaching the cathode.

DESCRIPTION OF THE PREFERRED EMBODIMENTS

Figure 1:
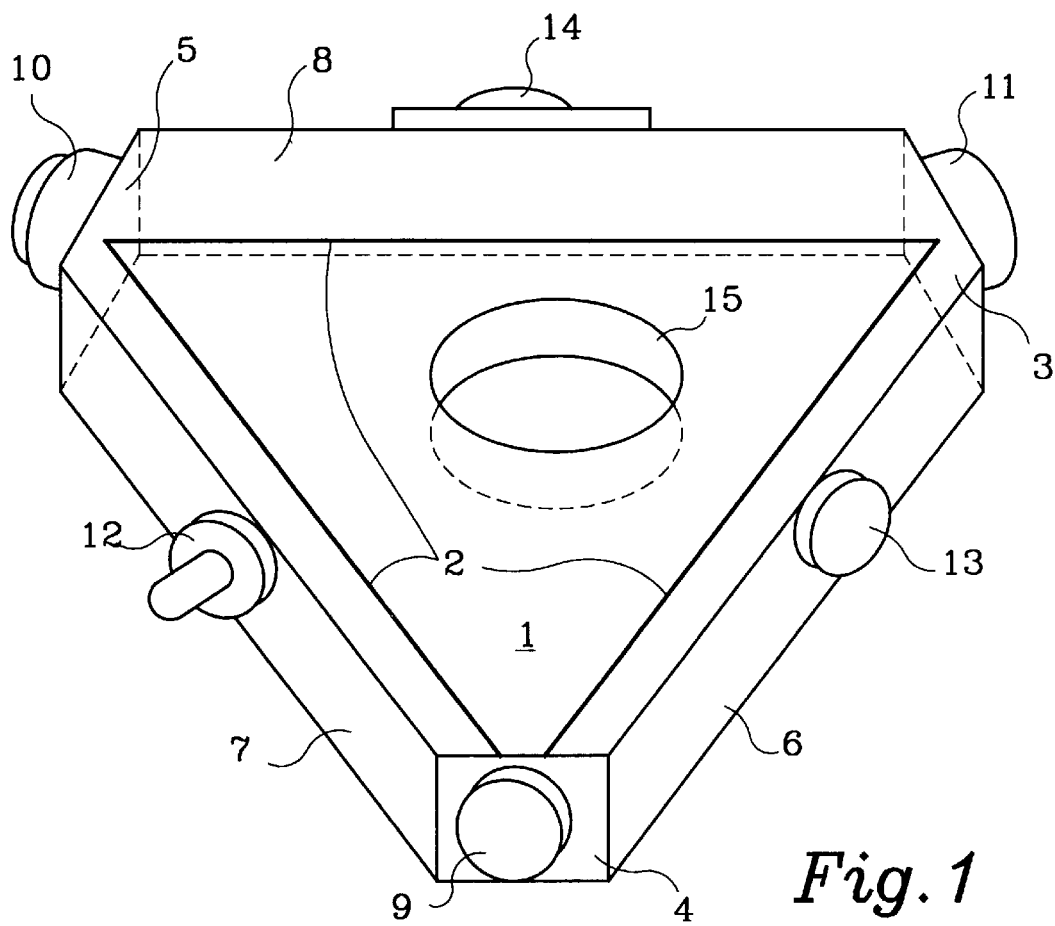
FIG. 1 is a plan view of a ring laser gyroscope showing the positions of the various components sealed to the ring laser gyroscope block.

FIG. 1 shows one form of gyroscope structure suited for the applicant's invention. Gyroscope block 1 is generally triangular in shape. The gyroscope block is formed of a glass or glass-like material such as Zerodur which has a low coefficient of thermal expansion (CTE). The low CTE is provided by concentrations of lithium oxide in the gyroscope block. Passages 2 within the gyroscope block link openings in the gyroscope block at each corner. The corners of the gyroscope block are truncated to provide mating surfaces 3, 4 and 5 for a mirror component at each corner. An opening at each corner (not shown) allows optical communication between components. The sides of gyroscope block 1 provide another three mating surfaces 6, 7 and 8. In the gyroscope shown, mating surfaces 4 and 5 have mated thereto adjustable mirror units 9 and 10, also comprised of a Zerodur material. Mating surface 3 has mated thereto a readout mirror 11, also of Zerodur. On the sides of the gyroscope, cathode 12 is mated to mating surface 7, and anodes 13 and 14 are mated to mating surfaces 6 and 8, respectively. The cathode and anodes may be composed of an aluminum or beryllium-type material or any other material suitable for gyroscope electrodes. Sub-passages (not shown) are connected to passages 2 between the corners of the gyroscope block, and optically connect the cathode and anodes to each other, and to the components at the corners. The components may be sealed to the gyroscope by various methods, including epoxy, soldering, glass frits, optical contacts, etc. The sealing method should prevent lasing gas located in the gas passage of the gyroscope block from escaping in any significant amount during the life of the gyroscope.

Figure 2:
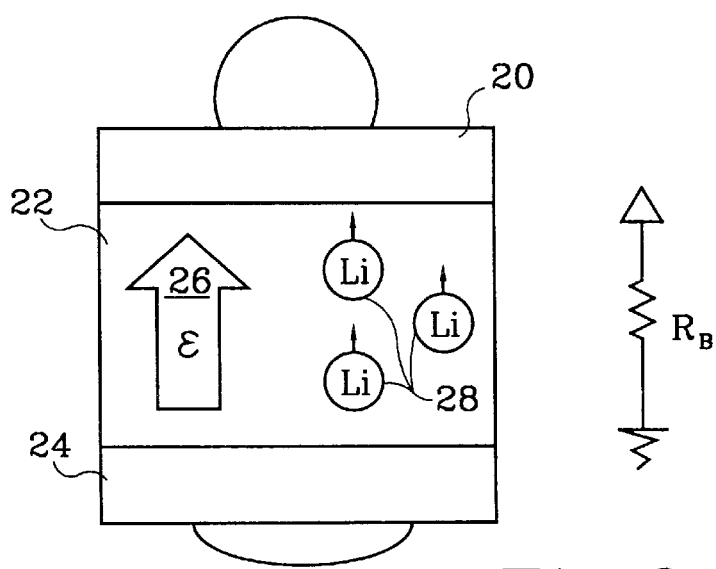
FIG. 2 shows selected mechanisms active once voltage is applied to the cathode of a prior art ring laser gyroscope.

FIG. 2 shows a representation of the critical portions of the gyroscope structure relative to the applicant's invention. A cathode, generally labeled 20, is sealed to gyroscope block 22. An anode or other component with a different voltage from the cathode is indicated by numeral 24. For example, the mirrors typically are grounded through an attached path-length correction mechanism mounted above the mirror. The anodes, of course, are connected to ground through a load resistor. Gyroscope mounting frame 24 is also typically at or near ground. The gas passages in the gyroscope block have a potential gradient from the cathode voltage to the anode voltage, thus also serve to create an electric field in the gyroscope block. As the gas passages illustrate, an electric field will form when the cathode and a component are simply at a different electric potentials; the component need not be grounded for an electric field to form. It will be assumed for the remainder of this application that reference to the anode is reference to any component having a different potential from the cathode.

When voltage is applied to the cathode to create the gas discharge inside the gyroscope block (i.e. laser beam), the space between the cathode and anode is subject to an electric field 26. Since the gyroscope block 22 lies between the cathode and anode, it is subject to this electric field, as shown in FIG. 2. Lithium oxide in gyroscope block 22 is dissociated into lithium ions 28 and oxide ions (not shown). The lithium ions then tend to drift or migrate toward the cathode as long as the electric field exists.

The ionic current created by the mobility of lithium ions in the presence of an electric field can be described by the conductivity of the gyroscope block material. For a typical gyroscope block material made of Zerodur, for example, the resistivity, $\rho$, is approximately $2 \times 10^{11} \Omega \cdot cm$ at 50° C., and may increase several orders of magnitude during some gyroscope operating ranges. The use of 50° C. simulates typical gyroscope burn-in conditions, and also the upper end of the operating range for many gyroscopes. In any event, resistivity is converted to resistance by multiplying the resistivity by the ratio between the distance between the cathode and the anode, and the effective cross-sectional area of the electric field in the block. Assuming a 5 cm² effective electric field cross-sectional area, and a distance of 5 cm between the cathode and an anode gives a resistance, $R_B$, of:

$$R_B = 2 \times 10^{11} \, \Omega \cdot cm * (5 \, cm/5 \, cm^2) = 2 \times 10^{11} \, \Omega. \quad (1\text{-}1)$$

By assuming a voltage, V, of 400 volts between the cathode and an anode during normal operation, a current, I of:

$$I = V/R^B = 400 \, volts/2 \times 10^{11} \Omega = 2 \times 10^{-9} \, amps, \quad (1\text{-}2)$$

travels through any point along the path between the cathode and the anode. This is also the current at the surface of the cathode, where the ions stop when they are neutralized by electrons here. Assuming the lithium ions are singly charged with a charge of $1.6 \times 10^{-19}$ coulombs per ion, $1.25 \times 10^{10}$ atoms of lithium are deposited per second at the cathode seal. Roughly, this produces a layer of lithium-rich material at the surface of the cathode during the life of the gyroscope of:

(1.25×10¹⁰ atoms/second)/(6.5×10¹⁴ atoms/cm²)=1.9×10⁻⁵ monolayers/second;

1.9×10⁻⁵ monolayers/second=6.92×10⁻² monolayers/hour;

(6.92×10⁻² monolayers/hour)*30,000 hours=2077 monolayers/lifetime;

(2077 monolayers/lifetime)*(4 Å/monolayer)=8308 Å/lifetime. (1-3)

assuming a 30,000 hour gyroscope life. The calculation assumes 20% lithium concentration at the cathode surface for each monolayer to define the lithium ion spacing. The actual composition of the material may vary, but for comparison with a gyroscope which includes dielectric barrier layers, these rough calculations will provide order of magnitude comparisons.

The layer of lithium-rich material formed at the cathode surface by the migration is probably significantly more brittle than the cathode, the gyroscope block, or most typical seal materials. In fact, the nature of this material may be similar to calcium carbonate (i.e. chalk). The weakness caused by this material is compounded by CTE mismatches associated with this seal area once this layer exists. It is estimated that the lithium concentration is about 20% at the seal under heavy migration compared with a 3.7% ideal concentration of lithium in the gyroscope block. Thus any reduction in this migration should significantly improve gyroscope life.

Figure 3:
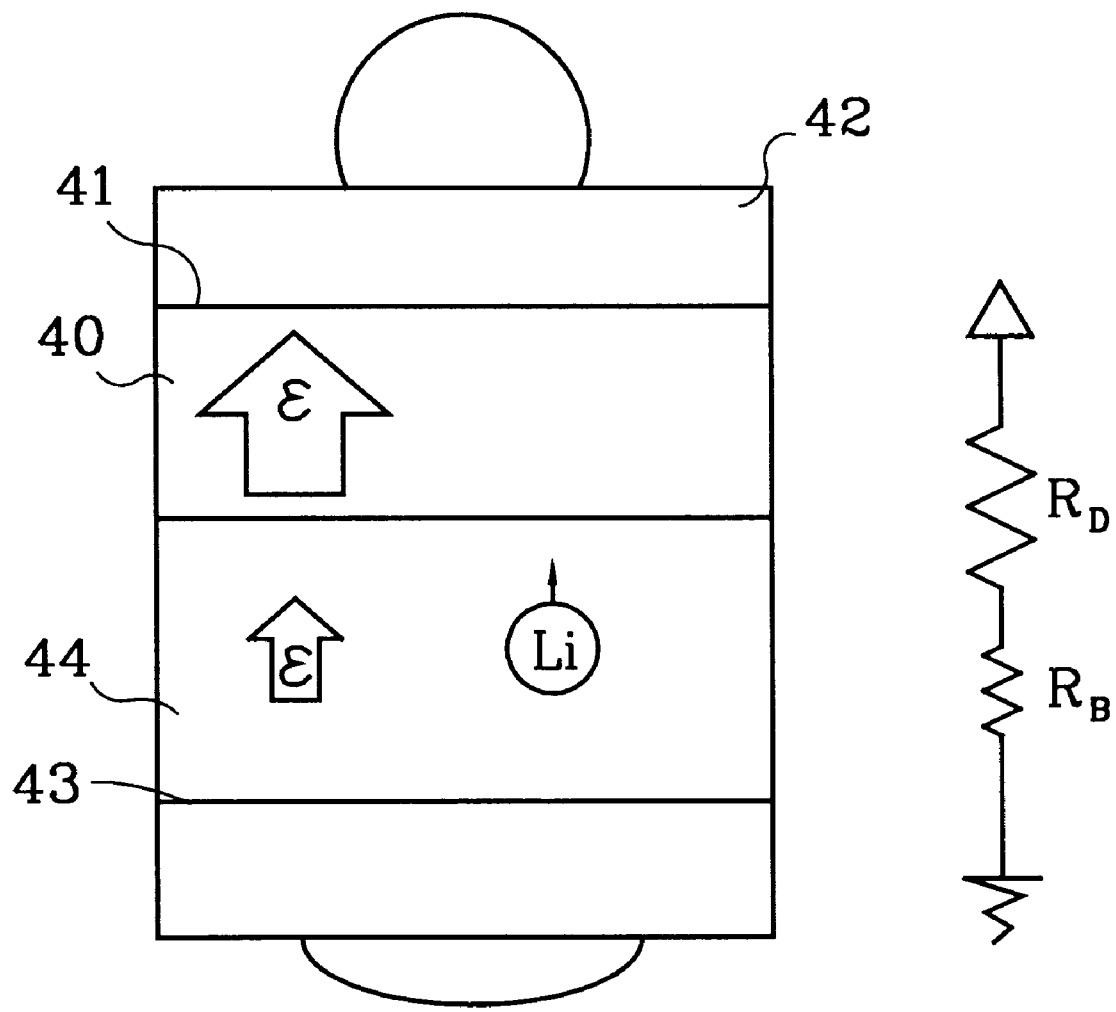
FIG. 3 shows selected mechanisms active once voltage is applied to the cathode of a ring laser gyroscope including a dielectric barrier material layer between the cathode and the gyroscope block.

One embodiment of the applicant's proposed system, shown in FIG. 3, adds a dielectric barrier material layer 40, having a much higher resistance then the gyroscope block, sandwiched between cathode layer 42 and gyroscope block 44. The resulting structure defines first mating surface 41 between the gyroscope block and the dielectric material layer, and second mating surface 43 between the component and the dielectric material layer. With the dielectric barrier material layer 40 included, an electric field still exists in gyroscope block 44. The majority of the electric field, however, occurs in the dielectric layer and not the gyroscope block, since the dielectric layer has a much larger resistance. This reduced electric field in the gyroscope block reduces the overall migration of lithium from the gyroscope block to the cathode seal. The layer also produces a barrier to the ions, preventing them from moving out of the gyroscope block into the cathode; rather they form a space charge in the gyroscope block at the dielectric surface.

The exact amount of increase in resistance, and thus decrease in migration of ions in the gyroscope block will depend on the dielectric barrier material chosen. Silicon nitride is one preferred material for use as the dielectric barrier material. The thickness of the barrier material will be selected based on a compromise between cost to apply the barrier material, and the desired reduction in ionic current. Assuming a thickness which is primarily easy to vapor deposit, $2 \times 10^{-4}$ cm, a 1 cm² barrier material cross-sectional area, and a resistivity, $\rho$, for the dielectric material of $1 \times 10^{17}$ $\Omega \cdot cm$, the dielectric resistance, $R_D$, would be:

$$R_D = 1 \times 10^{17} \, \Omega \cdot cm * (2 \times 10^{-4} \, cm/1 \, cm^2) = 2 \times 10^{13} \, \Omega. \quad (1\text{-}5)$$

A comparison with equation 1—1 reveals that $R_B << R_D$, and thus current, I, through the gyroscope would be:

$$I = V/(R_D) = 400 \, volts/2 \times 10^{13} \Omega = 2 \times 10^{-11} \, amps. \quad (1\text{-}6)$$

This current results in $1.25 \times 10^8$ atoms per second deposited on the surface, which over the life of the gyroscope would produce:

(1.25×10⁸ atoms/second)/(6.5×10¹⁴ atoms/cm²)=1.92×10⁻⁷ monolayers/second;

1.92×10⁻⁷ monolayers/second=6.92×10⁻⁴ monolayers/hour;

(6.92×10⁻⁴ monolayers/hour)*30,000 hours=21 monolayers/lifetime;

(21 monolayers/lifetime)*(4 Å/monolayer)=[83 Å/lifetime] (1-7)

again assuming a 30,000 hour gyroscope lifetime. A layer this thin has significantly less structural weaknesses or thermal expansion problems than the 8308 Å layer of the prior art system.

While a suggested dielectric layer thickness has been calculated, a dielectric layer thicker or thinner than this may be used depending on design constraints or to affect ion migration to a different extent.

While lithium has been used as example ionic material, migration of other materials is contemplated. It is, for example, contemplated that ionic materials, even ones having a charge opposite to that of lithium could exist. In this case, ion build-up would occur at the anode rather than the cathode. Use of the applicant's invention would not charge, however.

Placement of the dielectric material between the cathode and the gyroscope block may be accomplished in any number of ways. It may be formed as a deposited layer, such as by vapor deposition or other semiconductor processor techniques if the layer is relatively thin, or it may be a sheet of material which is welded, brazed, soldered or otherwise sealed to the cathode or and the gyroscope block, if it is too thick to be deposited. Deposition of the material is preferred since use of a separate material layer requires sealing of the material to the cathode and to the gyroscope block. The deposited layer eliminates one of the sealing steps and reduces the risk of a bad seal, since there is an overall smaller number of seals.

Materials to be used for the dielectric may be any substance which has a much higher resistance than the gyroscope block, and provides a better barrier than the gyroscope block to movement mobile ions. For example, a 1–4 micron layer of silicon nitride has a 100 times larger resistance than the gyroscope block and can reasonably be vapor deposited. Silicon nitride is also known to be an excellent barrier to ion migration, including lithium ion migration. Once a silicon nitride is applied by vapor deposition onto the cathode or the gyroscope block prior, standard semiconductor methods can be used to seal the cathode to the gyroscope block. Other contemplated materials include silicon oxide, silicon oxynitride, silicon oxycarbide, aluminum oxide, fused silica, alumina, yttrium oxide, and diamond. For example, exposing the surface of an alkali-containing glass to a mixture of silane and hydrocarbon gas at 600° C. has been shown to produce a layer of silicon oxycarbide which has a very low ionic conductivity and protects the glass surface against ionic diffusion. This technique is described in U.S. Pat. No. , 5,165,972 to Porter, which is hereby incorporate by reference. It may also be possible to maximize the effectiveness of the ionic barrier by using more than one dielectric material to serve as the dielectric layer.

So far, the applicant has described placement of the barrier material at the cathode. In fact, the barrier material could be attached to the anode or other component which cause the electric field. Unfortunately, since there are many components which have a charge different from the cathode, this method would require substantially more dielectric layers to be added to the gyroscope. Specifically, one dielectric layer for each component having a potential different from the cathode.

The dielectric layers would also have to be thicker since there would be more dielectric surface area, and thus less overall resistance. For example, if the anodes only are constructed with an added dielectric layer, this layer would need to be twice as thick to reduce the electric field the same amount as a dielectric layer added only to the cathode.

Furthermore, some components would be difficult to isolate from the cathode. The gas passages, for example, do not lend themselves to isolation. Despite these disadvantages, the user may fine some benefit in placing the barrier at the other components.

While the applicant has described various preferred techniques and materials which can be used to perform the applicant's invention, the applicant's contemplated invention should be thought of as limited only by the following claims.

I claim:

1. A ring laser gyroscope including a gyroscope block having therein mobile ions, and also including at least a first and second components which cause an electric field in the gyroscope block when dissimilarly charged, comprising:
    a dielectric barrier material layer having a larger resistance than the gyroscope block and isolating at least one of said first and second components from the gyroscope block, the dielectric barrier material characterized by its resistance to migration of mobile ions through its bulk.

2. The ring laser gyroscope of claim 1 wherein the first components is the cathode and said dielectric barrier material layer isolates the cathode from the gyroscope block.

3. A ring laser gyroscope of claim 1 wherein the first component is the anode or a component which is grounded and said dielectric barrier material layer isolates the anode or grounded component from the gyroscope block.

4. The ring laser gyroscope of claim 2 wherein said dielectric barrier material layer is selected from the group consisting of silicon nitride, silicon oxynitride, silicon oxycarbide, silicon oxide, yttrium oxide, aluminum oxide, alumina, diamond, and fused silica.

5. A gyroscope structure comprising:
    a gyroscope block having therein lithium ions, and defining at least a first mating surface;
    a silicon nitride layer, situated on the first mating surface and defining a second mating surface;
    a cathode situated on said second mating surface on said silicon nitride layer to form a sandwich of said silicon nitride layer between said cathode and said gyroscope block, whereby said silicon nitride layer reduces lithium ion migration in said gyroscope block.

6. A gyroscope structure comprising:
    a gyroscope block having therein lithium ions, and defining at least a first mating surface;
    a yttrium oxide layer, situated on the first mating surface and defining a second mating surface;
    a cathode situated on said second mating surface on said yttrium oxide layer to form a sandwich of said yttrium oxide layer between said cathode and said gyroscope block, whereby said yttrium oxide layer reduces lithium ion migration in said gyroscope block.

7. A method for constructing a ring laser gyroscope including a gyroscope block defining a first mating surface and having therein mobile ions, and at least a first component defining a second mating surface, and sealed to the gyroscope block, the mobile ions in the gyroscope block susceptible to migration when an electric field is applied in the gyroscope block, comprising the steps of:
    placing a layer of dielectric barrier material on either the first or second mating surface, the dielectric barrier material having a larger resistance than the gyroscope block, and further characterized by its resistance to migration of mobile ions;
    sealing the layer of dielectric barrier material to the other of said mating surfaces so that the layer of dielectric barrier material forms a barrier to mobile ions between the gyroscope block and at least the first component.

8. The method of claim 7 wherein the layer of dielectric barrier material is deposited.

9. The method of claim 7 wherein the layer of dielectric barrier material is deposited using vapor deposition.

10. The method of claim 7 wherein:

the layer of dielectric barrier material is placed on the first or second mating surface by a brazing, welding or soldering process.

11. The method of claim 7 wherein the first component comprises a cathode.

12. The method of claim 7 wherein said dielectric barrier material layer is selected from the group consisting of silicon nitride, silicon oxide, yttrium oxide, aluminum oxide, alumina, diamond, and fused silica.

13. A method of forming a gyroscope structure including a gyroscope block having therein mobile lithium ions comprising the steps of:

vapor depositing a layer of silicon nitride on a first mating surface on the gyroscope block;

sealing a cathode at a second mating surface to the layer of silicon nitride whereby the layer of silicon nitride is sandwiched between the gyroscope block mating surface and the cathode causing reduced migration of mobile lithium ions in the gyroscope.

14. A method of forming a gyroscope structure including a gyroscope block having therein mobile lithium ions comprising the steps of:

vapor depositing a layer of yttrium oxide on a first mating surface on the gyroscope block;

sealing a cathode at a second mating surface to the layer of yttrium oxide whereby the layer of yttrium oxide is sandwiched between the gyroscope block mating surface and the cathode causing reduced migration of mobile lithium ions in the gyroscope.

* * * * *